UNITED STATES PATENT OFFICE.

FRANCESCO RAMPICHINI, OF TRIESTE, AUSTRIA-HUNGARY.

ADHESIVE MATERIAL FOR GLUING PURPOSES.

1,089,960. Specification of Letters Patent. Patented Mar. 10, 1914.

No Drawing. Application filed September 6, 1912. Serial No. 718,873.

*To all whom it may concern:*

Be it known that I, FRANCESCO RAMPICHINI, a subject of the King of Italy, residing at No. 11 Via Barriera, Trieste, in Austria-Hungary, have invented a new and useful Adhesive Material for Gluing Purposes, of which the following is a specification.

The object of the invention is an adhesive material adapted for different purposes, especially for making joints in the leather employed in seamless boot and shoe manufacture, and especially for uniting the sole with the upper. In general the adhesive fluid is formed by a solution of celluloid with a suitable solvent, such as acetone, ether, amyl acetate, ethyl alcohol or the like; special substances being employed for obtaining a higher fluidity of the solution. As the said composition is not of the kind usually employed for gluing purposes, but is devised as an adhesive agent of such extraordinary adhesive force that pieces of leather joined therewith are more securely retained than when sewn or nailed, and as the method of applying the said material is singular, it must possess exceptional qualities, as will be understood from the description of the mode of applying this material to the above special purpose.

The upper surfaces of the two pieces of leather to be joined are ordinarily first subjected to a special mechanical treatment which lays open the bundles of fibers within the leather, and so frays out and separates the various fibers from one another that the liquid binding agent, when applied to the leather so treated and allowed to dry, forms a residue which partly extends a certain depth downwardly among the fibers and into the pores of the leather, and partly forms at the upper surface a very thin glossy layer. The two pieces so treated are joined one to the other after moistening the said layer with the solvent and by then pressing them together under suitable pressure. A proper joint, however, is not obtained if the adhesive agent first applied was not sufficiently fluid and could not sufficiently penetrate between the fibers and into the body of the leather; nor is a successful joint made if the fluid adhesive agent had too low a percentage of solid adhesive material, unless several applications or coats were given to the opened fibers of the leather, or an exceptionally thick layer was applied. In both cases there results both a loss of the solvent and also a waste of time.

It is evident from the above that the adhesive material, which is to serve the desired purpose, must possess two properties, namely, a high degree of fluidity and such a high percentage of solid adhesive material, that a single thin layer of the solution suffices to give the desired result.

If a solution of celluloid in chemically or technically pure acetone is prepared, it is not possible to obtain a liquid sufficiently fluid to serve many purposes, when more than 16 to 18 parts by weight of celluloid per 100 parts by weight of acetone are present, because the thick solution obtained by increasing the proportion of celluloid is not then in a condition to penetrate between the fibers in the leather and consequently a sufficiently sure joint cannot be made. To obtain a very fluid solution, suitable for the purpose named and other purposes, and notwithstanding having a larger percentage of celluloid, one or more crystallizable organic acids, such as oxalic acid, tartaric acid, citric acid, for example, are added to the solution in opposite quantity. Preferably oxalic acid is used, as it produces the best result, while in all cases the addition of a crystalline or dry substance obviates dilution of the solution and will not retard drying of the same.

The adhesive composition consists, for example, of the following ingredients and in the mentioned quantities, viz: chemically or technically pure acetone 100 pounds, celluloid 20 to 30 pounds, oxalic acid (crystalline) ½ to 2 pounds. These substances are introduced into an iron vessel which is hermetically sealed. The materials contained therein are then mixed at the ordinary temperature (by an agitator for 12 to 24 hours) either continuously or with intermittent pauses. The product obtained can either be used immediately or be stored in air-tight vessels as long as desired. It perfectly fulfils the desired purpose, and is a remarkable improvement on all adhesive substances on the celluloid basis which have hitherto been employed, not only in respect to the saving in time and material, but also because it is not coagulated when metals, such as brass, are in contact therewith, this latter property having been previously unattainable by a solution of celluloid in acetone. The employment of oxalic acid has not only the desired effect of giving fluidity to the celluloid solution, but, since the oxalic acid is directly soluble in acetone, a mixture is produced which is entirely free from water and other slowly evaporating solvents. Similar advantages are attained with the use of other solid organic acids.

The solid constituents of the composition can be mixed together and added simultaneously to the solution, but they may also be dissolved one after another, or be dissolved separately and their solutions then mixed together.

What I claim as my invention, and desire to secure by Letters Patent, is:

1. An adhesive fluid for gluing purposes, consisting of acetone, celluloid and oxalic acid.

2. The herein-described adhesive fluid for gluing purposes, consisting of acetone one hundred pounds, celluloid twenty to thirty pounds, and oxalic acid one half to two pounds.

3. An adhesive material for gluing purposes consisting of celluloid combined with a suitable solvent and oxalic acid.

In testimony whereof I have signed my name to this specification in the presence of two subscribing witnesses.

Dr. FRANCESCO RAMPICHINI.

Witnesses:
BERNARDO LEDNER,
CAMILLO CAMERINI.